(12) United States Patent
Jeon et al.

(10) Patent No.: US 9,196,059 B2
(45) Date of Patent: Nov. 24, 2015

(54) METHOD AND APPARATUS FOR PROCESSING VIDEO SIGNALS USING BOUNDARY INTRA CODING

(75) Inventors: Yong Joon Jeon, Seoul (KR); Jae Won Sung, Seoul (KR); Byeong Moon Jeon, Seoul (KR)

(73) Assignee: LG Electronics Inc., Seoul (KR)

( * ) Notice: Subject to any disclaimer, the term of this patent is extended or adjusted under 35 U.S.C. 154(b) by 639 days.

(21) Appl. No.: 13/145,430

(22) PCT Filed: Jan. 6, 2010

(86) PCT No.: PCT/KR2010/000047
§ 371 (c)(1),
(2), (4) Date: Jul. 20, 2011

(87) PCT Pub. No.: WO2010/087589
PCT Pub. Date: Aug. 5, 2010

(65) Prior Publication Data
US 2011/0274166 A1 Nov. 10, 2011

Related U.S. Application Data

(60) Provisional application No. 61/148,056, filed on Jan. 29, 2009, provisional application No. 61/155,470, filed on Feb. 25, 2009.

(51) Int. Cl.
*H04N 7/32* (2006.01)
*G06T 9/00* (2006.01)
(Continued)

(52) U.S. Cl.
CPC ... *G06T 9/00* (2013.01); *G06T 9/20* (2013.01); *H04N 19/11* (2014.11); *H04N 19/14* (2014.11); *H04N 19/46* (2014.11); *H04N 19/593* (2014.11); *H04N 19/61* (2014.11); *H04N 19/70* (2014.11)

(58) Field of Classification Search
CPC ...... G06T 9/00; G06T 9/20; H04N 19/00157; H04N 19/00884; H04N 19/00042; H04N 19/00763; H04N 19/00545; H04N 19/00781
USPC ........................................................ 375/240
See application file for complete search history.

(56) References Cited

U.S. PATENT DOCUMENTS

2003/0059120 A1   3/2003  Boon et al.
2005/0243920 A1*  11/2005 Murakami et al. ....... 375/240.12
2007/0036215 A1   2/2007  Pan et al.

FOREIGN PATENT DOCUMENTS

KR   10-20050109525 A   11/2005
KR      10-0643126 B1   11/2006
KR      10-0672327 B1    1/2007

OTHER PUBLICATIONS

Congxia Dai et al: "Geometry-Adaptive Block Partitioning for Intra Prediction in Image&Video Coding", Image Processing, 2007. ICIP 2007. IEEE International Conference on, IEEE, PI, Sep. 1, 2007, pp. VI-85, XP031158268, ISBN : 978-1-4244-1436-9.

(Continued)

*Primary Examiner* — Tat Chio
*Assistant Examiner* — Nguyen Truong
(74) *Attorney, Agent, or Firm* — Fish & Richardson P.C.

(57) ABSTRACT

A boundary intra coding flag is obtained according to a current macroblock type. When the boundary intra coding flag indicates that the current macroblock is coded in an intra prediction mode using boundary intra coding, boundary coding information is obtained, and a boundary in the current macroblock is induced based on the boundary coding information. Therefore, the regions divided by the boundary can be coded in the intra prediction mode. The accuracy of a predicted pixel value can be improved by performing the intra prediction for regions divided by the boundary. Accordingly, the residual data transmitted to a decoder can be reduced.

8 Claims, 14 Drawing Sheets

(51) Int. Cl.
*G06T 9/20* (2006.01)
*H04N 19/70* (2014.01)
*H04N 19/46* (2014.01)
*H04N 19/61* (2014.01)
*H04N 19/593* (2014.01)
*H04N 19/11* (2014.01)
*H04N 19/14* (2014.01)

(56) References Cited

OTHER PUBLICATIONS

Dong Liu et al: "Edge-Oriented Uniform Intra Prediction", IEEE Transactions on Image Processing, IEEE Service Center, Piscataway, NJ, US, vol. 17, No. 10, Oct. 1, 2008, pp. 1827-1836, XP011248122, ISSN:1057-7149.

Dong Liu et al: "Image Compression With Edge-Based Inpainting", IEEE Transactions on Circuits and Systems for Video Technology, IEEE Service Center, Piscataway, NJ, US, vol. 17, No. 10, Oct. 1, 2007, pp. 1273-1287, XP011193147, ISSN:1051-8215, DOI: 10.1109/TCSVT.2007.903663.

Divorra Escoda O et al: "Geometry-Adaptive Block Partitinaing for Video Coding", 2007 IEEE International Conference on Acoustics, Speech, and Signal Processing Apr. 15-20, 2007 Honolulu, HI, USA, IEEE, Piscataway, NJ, USA, Apr. 15, 2007, pp. 1-657, XP031462947, ISBN:978-1-4244-0727-9.

European Search Report dated Jul. 3, 2012 for Application No. 10735980, 15 pages.

International Search Report dated Jul. 29, 2010 for Application No. PCT/KR2010/000047, with English translation, 4 pages.

* cited by examiner

FIG. 5

| Base line information | 0 (left) | 1 (top) | 2 (right) | 3 (bottom) |
|---|---|---|---|---|
| Position of base pixel | (0, Base distance information) | (Base distance information, 0) | (15, Base distance information) | (Base distance information, 15) |
| Position of reference pixel | (-1, Base distance information) | (Base distance information, -1) | (16, Base distance information) | (Base distance information, 16) |
| Vector between base pixel and reference pixel | (1, 0) | (0, 1) | (-1, 0) | (0, -1) |

FIG. 6

|  | mb_pred( mb_type ) { |
|---|---|
|  | if( MbPartPredMode( mb_type,0 ) == Intra_4x4 ll |
|  | MbPartPredMode( mb_type,0 ) == Intra_8x8 ll |
|  | MbPartPredMode( mb_type,0 ) == Intra_16x16 ) { |
|  | if( MbPartPredMode( mb_type,0 ) == Intra_4x4 ) |
|  | : |
|  | if( MbPartPredMode( mb_type,0 ) == Intra_8x8 ) |
|  | : |
| S300 | if( MbPartPredMode( mb_type,0 ) == Intra_16x16 ) |
|  | { |
|  | boundary_coding_flag |
|  | if( boundary_coding_flag ) { |
| S310 | boundary_length |
| S320 | base line information |
| S330 | base distance information |
|  | : |

| | |
|---|---|
| S400 | for( idx=0; idx<boundary_length-1; idx++ ) |
| | BoundaryCode = boundary_code[idx]; |
| S410 | (mx,my) = movement( PrevTurningDirection, dx, dy, BoundaryCode ); |
| | (NextX,NextY) = (CurrX,CurrY) + (mx,my); |
| | : |
| S420 | (PrevX,PrevY) = (CurrX,CurrY); |
| | (CurrX,CurrY) = (NextX,NextY); |
| | : |
| S430 | if( BoundaryCode == 1 ll BoundaryCode == 3 ) |
| S440 | if( PrevTurningDirection == 1 ) |
| | PrevTurningDirection = 0 |
| | else |
| | PrevTurningDirection = 1; |
| | : |

METHOD AND APPARATUS FOR PROCESSING VIDEO SIGNALS USING BOUNDARY INTRA CODING

FIELD OF THE INVENTION

The present invention relates to a method and apparatus associated with intra prediction.

BACKGROUND ART

In order to enhance a compression rate of a video signal, a method of eliminating temporal redundancy and spatial redundancy, i.e., intra prediction or inter prediction, is performed, and DC conversion and vector quantization techniques are used.

DETAILED DESCRIPTION OF THE INVENTION

Technical Objects

An object of the present invention is to efficiently process video signals by using intra prediction.

Technical Solutions

The present invention proposes a video signal processing method, wherein a flag indicating whether or not a macroblock performs intra prediction by using boundary intra coding is used with respect to the corresponding macroblock.

The present invention proposes a video signal processing method, wherein, in case a macroblock uses performs intra prediction by using boundary intra coding, position information of a pixel located at a boundary is coded by using boundary intra coding.

The present invention proposes a video signal processing method, wherein, intra prediction is performed on regions divided by a boundary within a macroblock, by using pixels neighboring the divided regions.

The present invention proposes a video signal processing method, wherein boundary intra coding is adaptively used depending upon a macroblock size.

Effects of the Invention

According to the present invention, by using a flag indicating whether or not a current macroblock performs intra prediction using boundary intra coding, accuracy in the intra prediction may be enhanced, and residual data may be reduced. Also, by coding position information of pixels located in the boundary using boundary intra coding, the size of pixel position information being transmitted may be reduced, thereby enabling an efficient coding process to be performed.

By performing intra prediction on regions that are divided based upon the boundary, accuracy in predicted pixel values may be enhanced. And, accordingly, residual data being transmitted to a decoder may be reduced.

BRIEF DESCRIPTION OF THE DRAWINGS

FIG. 5 illustrates a table showing a method for specifying a position of a base pixel.

FIG. 6 illustrates an example of realizing base line information and base distance information within a syntax according to an embodiment of the present invention.

FIG. 8 illustrates an exemplary syntax showing a method for deriving a position of a boundary pixel by using boundary coding information according to an embodiment of the present invention.

BEST MODE FOR CARRYING OUT THE PRESENT INVENTION

Figure 1:
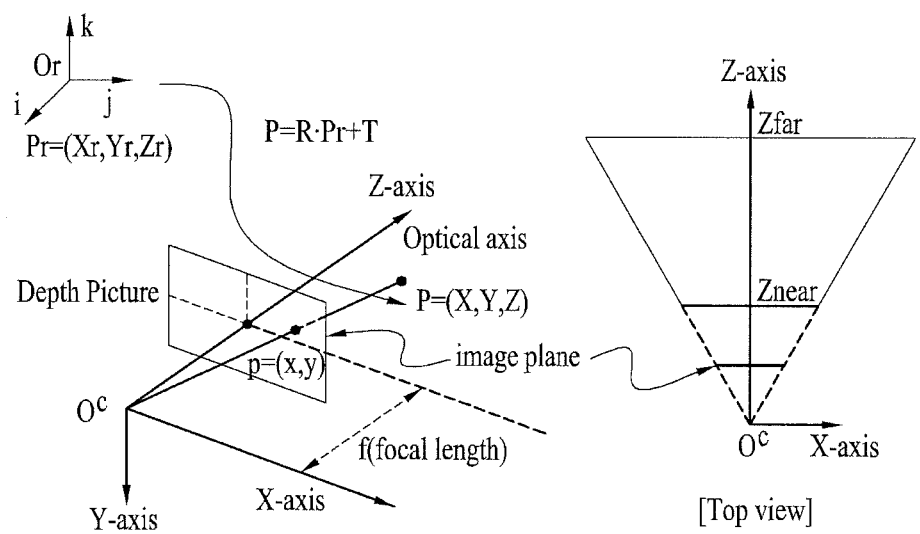
FIG. 1 illustrates a drawing shown to describe a depth concept, as an embodiment applied in the present invention.

In order to achieve the technical objects of the present invention, according to the present invention, a video signal processing method includes the steps of obtaining a current macroblock type, obtaining a boundary coding flag (boundary_coding_flag) depending upon the current macroblock type, when the boundary intra coding flag (boundary_coding_flag) indicates that the current macroblock is coded in an intra prediction mode by using boundary intra coding, obtaining boundary coding information, deriving a boundary within the current macroblock based upon the boundary coding information, and coding regions divided based upon the boundary in the intra prediction mode, and wherein the boundary may refer to a boundary of a region having a pixel value relatively different from a pixel value of a neighboring region within the current macroblock.

According to the present invention, the boundary intra coding flag (boundary_coding_flag) may correspond to a flag indicating whether or not the current macroblock is coded in the intra prediction mode by using boundary intra coding, and the boundary intra coding may correspond to an intra prediction mode based on a boundary within the current macroblock.

According to the present invention, the boundary intra coding flag (boundary_coding_flag) may be obtained when the current macroblock is coded in the intra prediction mode.

According to the present invention, the boundary coding information may include information on a number of pixels located at the boundary, base line information, base distance information, a boundary code, and vector direction information.

According to the present invention, the boundary code may be obtained for each pixel located in the boundary based upon the information on the number of pixels located at the boundary.

According to the present invention, the step of deriving a boundary within the current macroblock may further include a step of specifying a base pixel, and wherein the boundary is derived by using the base pixel.

According to the present invention, the base pixel may be specified based upon base line information and base distance information, and the base pixel may correspond to a pixel located in the boundary and a pixel located in an edge portion of the macroblock.

According to the present invention, in the step of coding regions divided based upon the boundary in the intra prediction mode, pixel values of the divided regions may be predicted by using prediction mode information on the current macroblock and pixels adjacent to the divided regions.

According to the present invention, the prediction mode may correspond to information based upon the current macroblock type, and wherein the prediction mode corresponds to any one of vertical prediction, horizontal prediction, average value prediction, and flat surface prediction.

MODE FOR CARRYING OUT THE PRESENT INVENTION

Hereinafter, the preferred embodiments of the present invention will now be described in detail with reference to the accompanying drawings. Beforehand, the terms or vocabularies used in the specification and scope of the present invention should not be limited and understood by their general and literal meanings. Therefore, it should be understood that, based upon the principle specifying that the inventor may adequately define the meaning of the terms used to described his or her invention, the terms used herein should be interpreted and understood by the significance and concept best fitting the technical scope and spirit of the present invention. Therefore, the embodiments of the present invention described herein and the structures shown in the appended drawings are merely examples of the preferred embodiments of the present invention. And, since the given examples do not fully represent the technical scope and spirit of the present invention, at the point of filing the present invention, it should be understood that there may exist diverse equivalents and variations of the present invention that can replace the examples presented herein.

The technique of compression encoding video signal data considers the characteristics of spatial redundancy, temporal redundancy, scalable redundancy, and a redundancy existing between viewpoints. Among such characteristics, in coding a depth picture for realizing a 3-dimensional display using multiple perspective (or multiview) images, compression encoding may be performed while considering the characteristics of spatial redundancy and temporal redundancy. Such technique for compression encoding may be applied to an image sequence configured of depth pictures, as well as an image sequence configured of color pictures or an image sequence configured of both depth pictures and color pictures. Herein, the term depth may signify a difference in variation, which may occur due to a difference in viewpoints (or perspectives). And, a detailed description of the same will be given with reference to FIG. 1. Additionally, in the description of the present invention, the terms depth information, depth data, depth picture, depth sequence, depth coding, depth bit stream, and so on may be flexibly interpreted as depth-related information in accordance with the above-mentioned definition of the term depth. Furthermore, in the description of the present invention, the term coding may include the concepts of both coding and decoding and may also be flexibly interpreted in accordance with the technical scope and spirit of the present invention.

Herein, a bit sequence structure of a video signal is defined as a separated layer structure referred to as an NAL (Network Abstraction Layer), which is located between a VCL (Video Coding Layer), which processes moving image coding itself, and a lower-layer system, which transmits and stores coded information. An output of the coding process corresponds to VCL data and is mapped in NAL units prior to being transmitted or stored. Each NAL unit includes compressed video data or RBSP (Raw Byte Sequence Payload (data resulting from moving image compression)), which refers to data corresponding to header information.

The NAL unit is essentially configured of two portions, the two portions being an NAL header and RBSP. The NAL header includes flag information (nal_ref_idc) indicating whether or not a slice, which becomes an NAL unit reference picture, is included, and an identifier (nal_unit_type) indicating a type of the NAL unit. Compressed original (or initial) data are stored in the RBSP. And, in order to express an RBSP length as a multiple of 8 bits, an RBSP trailing bit is added to an end portion of the RBSP. Such NAL unit types may include IDR (Instantaneous Decoding Refresh) pictures, SPS (Sequence Parameter Set), PPS (Picture Parameter Set), SEI (Supplemental Enhancement Information), and so on.

Also, in the technology standard, in order to realize the target products with an adequate cost, the target products are limited to various profiles and levels. Herein, a decoder should meet with the limitations defined for the respective profile and level. As described above, the two concepts of profile and level are defined in order to indicate the function or parameter enabling the decoder to respond to up to a certain compression image range. A profile identifier (profile_idc) indicates the specific profile upon which the bit stream is based. Herein, a profile identifier refers to a flag indicating the profile upon which the bit stream is based. For example, in an H.264/AVC, when the profile identifier is 66, this indicates that the bit stream is based upon a base line profile. And, when the profile identifier is 77, this indicates that the bit stream is based upon a main profile. And, when the profile identifier is 88, this indicates that the bit stream is based upon an extended profile. The profile identifier may be included in a sequence parameter set.

Therefore, in order to treat (or process) an image sequence including depth pictures (hereinafter referred to as a depth sequence), it should be identified whether or not the inputted bit stream corresponds to a profile of a depth sequence. And, when the bit stream is identified to correspond to the profile of a depth sequence, a syntax is required to be added, so that at least one set of additional information associated with depth coding can be transmitted. Herein, the profile of a depth sequence may indicate a profile mode treating (or processing) depth pictures as an additional technique of the H.264/AVC, or the profile of a depth sequence may indicate a profile mode related to a multiview video, which includes depth pictures. Since depth coding corresponds to an additional technique for the conventional AVC technique, it would be more efficient to add a syntax as additional information for a case where the coding mode is the depth coding mode, rather than an unconditional syntax. For example, when a profile identifier of the AVC indicates the profile of a depth sequence, encoding efficiency may be enhanced by adding information on depth coding.

A sequence parameter set refers to header information including information covering the coding of the overall sequence, such as profile, level, and so on. Since the entire coin presses moving image, i.e., sequence shall always begin from the sequence header, the sequence parameter set best fitting the header information should reach the decoder earlier than the data. Eventually, the sequence parameter set RBSP performs the role of header information for the result data of moving image compression. When a bit stream is inputted, the profile identifier first identifies which one of the plurality of profiles the inputted bit stream is based upon. Accordingly, by adding a portion that determines whether or not the inputted bit stream relates to a profile of a depth sequence (e.g., "If (profile_idc==DEPTH_PROFILE)") to the syntax, it is determined whether or not the inputted bit stream relates to the profile of a depth sequence. Then, only when it is verified and approved that the inputted bit stream does in fact relate to the profile of a depth sequence, diverse attribute information may be added. For example, a number of the overall views of the depth sequence, a number of depth-view reference pictures, a view identification number of each depth-view reference picture, and so on, may be added. Furthermore, a decoded picture buffer may use diverse information on depth-view reference pictures in order to create and manage a reference picture list.

FIG. 1 illustrates a drawing shown to describe a depth concept, as an embodiment applied in the present invention.

As described above, depth refers to a difference in variation, which occurs due to a difference in viewpoints (or perspectives) in an image sequence taken (or filmed) by a plurality of cameras. Referring to FIG. 1, a camera position (0c) indicates an origin of 3D camera coordinates system, and a Z-axis (optical axis) should form a straight line with the viewing angle (or direction) of the eyes. Herein, a random point P=(X,Y,Z) of the camera coordinates system may be projected onto a random point p=(x,y) within a 2-dimensional image plane, which is perpendicular to the Z axis.

And, the 2D image plane in this case may signify a color picture. Furthermore, p=(x,y) of the 2D image plane may be expressed as value Z of the 3-dimensional coordinates system of P=(X,Y,Z). And, the 2D image plane in this case may signify a depth picture. Herein, a focus length (f) may indicate a distance between a camera position and an image plane.

Moreover, although P=(X,Y,Z) of the 3D camera coordinates system represents a random point within the camera coordinates system, when a picture is taken by a plurality of cameras, a common reference coordinates system for the plurality of cameras may be required. In FIG. 1, a random point of the reference coordinates system, which is based upon point 0w, may correspond to Pw=(Xw,Yw,Zw). And, point Pw=(Xw,Yw,Zw) may be converted to a random point P=(X,Y,Z) of the camera coordinates system by using a 3×3 rotation matrix R and a 3×1 translation vector T. Herein, P may be acquired (or obtained) by using Equation 1 shown below.

$$P=R*Pw+T \quad \text{[Equation 1]}$$

When newly defining the term depth picture or depth map based upon the above description, depth picture or depth map may refer to a group of information, which consists of a relative digitalization of the distance between a camera position and the actual object based upon the position of the camera. And, this may also be referred to as a picture unit, a slice unit, and so on. Additionally, the depth information within the depth picture or depth map may be expressed in pixel units.

Depth information of the depth picture may be received (or obtained) from a Z value of 3-dimensional coordinates P=(X,Y,Z) respective to the camera coordinates system. The Z value belongs to a range of real numbers, and, this may be indicated in a digital image format by quantizing the Z value to a value belonging to a range of integers. For example, the depth information of the depth picture may be quantized by using Equation 2 or Equation 3 shown below.

$$Zq=\text{round}(255*(Z-Znear)/(Zfar-Znear)) \quad \text{[Equation 2]}$$

$$Zq=\text{round}(255*(1/Z-1/Zfar)/(1/Znear-1/Zfar)) \quad \text{[Equation 3]}$$

As shown in Equation 2 and Equation 3, Zq indicates quantized depth information. Referring to a [Top view] of FIG. 1, Znear represents the lower limit of the Z coordinate value, and Zfar indicates the upper limit of the Z coordinate value. The depth information that is quantized in accordance with Equation 2 and Equation 3 may be given an integer value ranging from 0~255.

As described above, the depth picture or depth map may be coded by using a sequence along with the image sequence of the color picture, or by using a separate sequence. And, in this case, a variety of embodiments may be applied for the compatibility with the conventional codec. For example, a depth coding technique may be applied as a supplemental technique so as to provide compatibility with the H.264 codec, or the depth coding technique may be applied as an extension technique within an H.264/AVC multiview video coding process, or the depth coding technique may be applied as an extension technique within an H.264/AVC scalable video coding process. Furthermore, the depth coding technique may also be used as a separate codec technique for coding only an image sequence including depth pictures. Hereinafter, reference will be made on detailed embodiments for depth coding, and the detailed embodiments of depth coding may be applied to all of the above-described cases.

Figure 2:
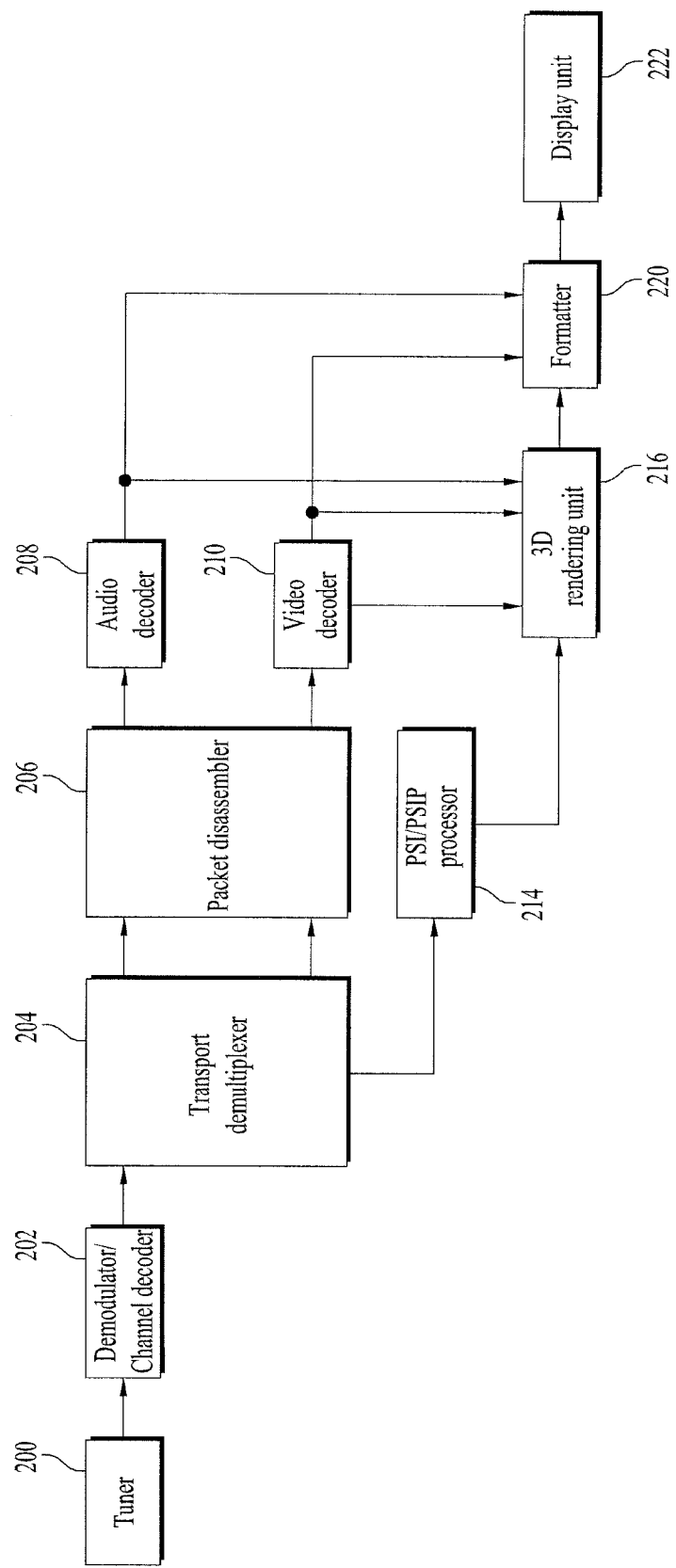
FIG. 2 illustrates an internal block view of a broadcast receiver having depth coding applied thereto, as an embodiment applied in the present invention.

FIG. 2 illustrates an internal block view of a broadcast receiver having depth coding applied thereto, as an embodiment applied in the present invention.

The broadcast receiver according to the embodiment of the present invention receives air wave (or sky wave) broadcast signals so as to playback (or reproduce) images. The broadcast receiver may use the received depth-associated information so as to create 3-dimensional contents. The broadcast receiver includes a tuner (200), a demodulator/channel decoder (202), a transport demultiplexer (204), a packet disassembler (206), an audio decoder (208), a video decoder (210), a PSI/PSIP processor (214), a 3D rendering unit (216), a formatter (220), and a display unit (222).

Among the plurality of broadcast signals being inputted through an antenna (not shown), the tuner (200) selects a broadcast signals of any one channel chosen by the user and outputs the selected signal. The demodulator/channel decoder (202) demodulates the broadcast signal outputted from the tuner (200) and performs error correction decoding on the demodulated signal, so as to output a transport stream (TS). The transport demultiplexer (204) demultiplexes the transport stream, separates (or splits) a video PES and an audio PES, and extracts PSI/PSIP information. The packet disassembler (206) disassembles the packets for the video PES and the audio PES, thereby recovering a video ES and an audio ES. The audio decoder (208) decodes the audio ES and outputs an audio bit stream. The audio bit stream is converted into an analog audio (or voice) signal by a digital to analog converter (not shown). Then, after being amplified by an amplifier (not shown), the amplified signal is outputted through a speaker (not shown). The video decoder (210) decodes the video ES so as to recover the original (or initial) image. The decoding process of the audio decoder (208) and the video decoder (210) may be performed based upon a packet ID (PID), which is verified by the PSI/PSIP processor (214). During the decoding process, the video decoder (210) may extract depth information. Also, the video decoder (210) may extract supplemental information that is required for creating images of a virtual camera view, e.g., camera information, or information for predicting an occlusion, which corresponds to a region that is covered by an obstacle (or object) located relatively in front of the camera (e.g., geometrical information, such as an outline (or silhouette) of the object, information on the transparency of the object, and color information), and so on, thereby providing the extracted information to the 3D rendering unit (216). However, according to another embodiment of the present invention, the depth information and/or supplemental information may be split (or separated) by the transport demultiplexer (204).

The PSI/PSIP processor (214) receives PSI/PSIP information from the transport demultiplexer (204) and parses the received information and stores the parsed information in a memory (not shown) or a register, thereby playing-back (or reproducing) the broadcast program based upon the stored information. The 3D rendering unit (216) uses the recovered image, the depth information, the supplemental information, and the camera parameters, so as to create depth information from a virtual camera position.

Also, by using the recovered image and the depth information from the virtual camera position, the rendering unit (216) performs 3D warping, thereby creating an image from the virtual camera position. According to the embodiment of the present invention, the 3D rendering unit (216) is described as a separate block of the video decoder (210), this is merely exemplary. And, therefore, the 3D rendering unit (216) may also be operated while being included in the video decoder (210).

The formatter (220) formats the image that is recovered during the decoding process. i.e., the image taken by an actual camera, and the image created by the 3D rendering unit (216) to best fit the display method of the corresponding receiver. Thereafter, the formatted 3D images are displayed through the display unit (222). Herein, the synthesis of the depth information and image of the virtual camera position performed by the 3D rendering unit (216) and the image formatting performed by the formatter (220) may be optionally performed in response to a user command. More specifically, the user may manipulate a remote controller (not shown) so that the synthesized image is not displayed, and the user may also use the remote controller to designate a time point at which the image synthesis is to be performed.

As described above, the depth information is used by the 3D rendering unit (216) in order to create a 3D image. However, according to another embodiment of the present invention, the depth information may also be used by the video decoder (210). Hereinafter, various embodiments of the video decoder (210) using the depth information will now be described.

Figure 3:
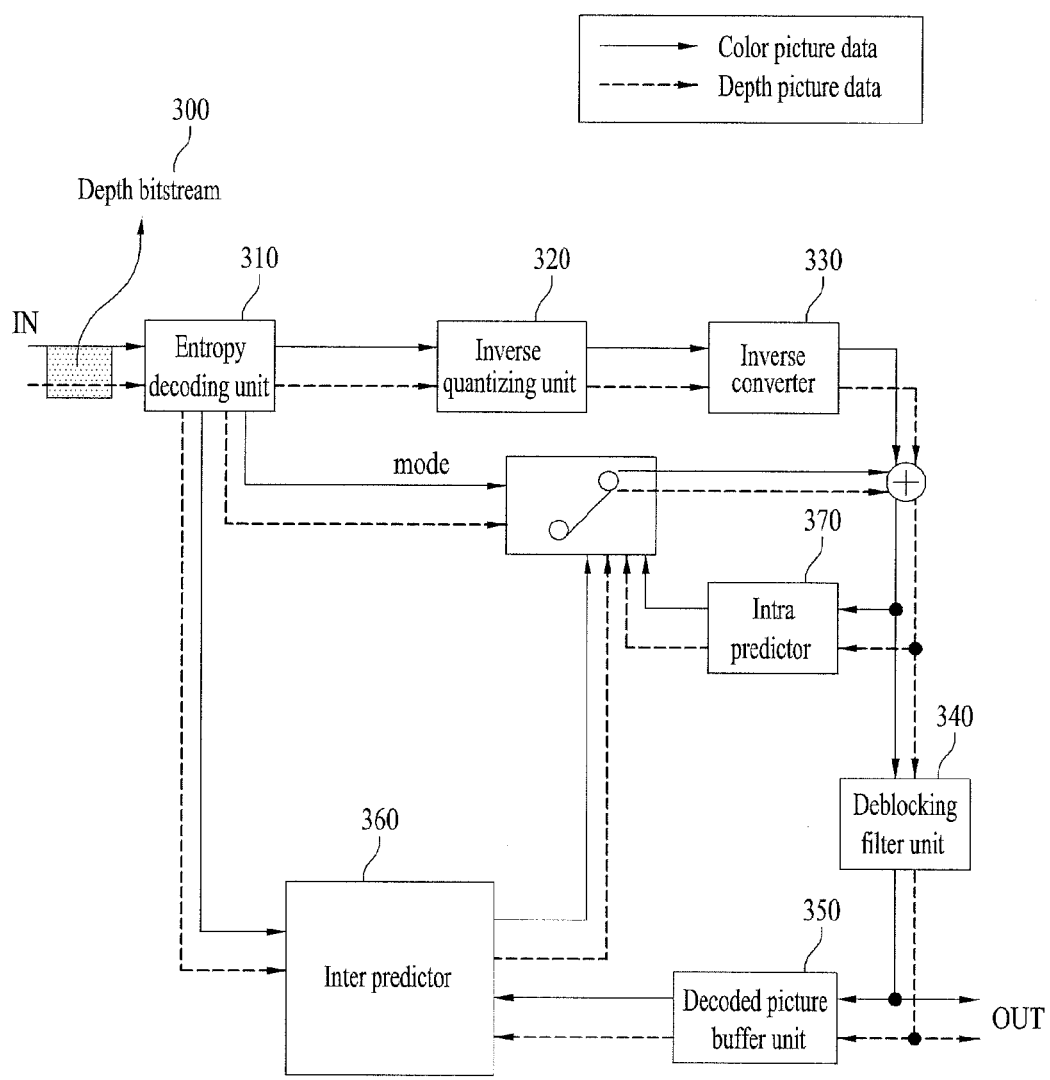
FIG. 3 illustrates an overall block view of a video decoder, as an embodiment applied in the present invention.

FIG. 3 illustrates an overall block view of a video decoder, as an embodiment applied in the present invention.

Referring to FIG. 3, the video decoder (210) may broadly include an entropy decoding unit (310), an inverse quantizing unit (320), an inverse converter (330), a deblocking filter unit (340), a decoded picture buffer unit (350), an inter predictor (360), and an intra predictor (370). Herein, the solid line represents a flow of the color picture data, and the dotted line represents a flow of the depth picture data. As described above, in FIG. 3, the color picture data and the depth picture data are shown to be different from one another. However, this may indicate that each data correspond to a different bit stream or may simply differentiate the flow of each data type within a single bit stream. More specifically, the color picture data and the depth picture data may either be transmitted as a single bit stream or be transmitted as separate bit streams. And, in FIG. 3, only the flow of the data is shown, and the example shown in FIG. 3 does not limit the data flow as being performed only in a single decoder. Moreover, hereinafter, the term picture shall be understood as a concept including both color picture and depth picture.

First of all, in order to decoder the received depth bit stream (300), parsing is performed in NAL units. At this point, various types of depth-associated attribute information may be included in an NAL header area, an extension area of the NAL header, a sequence header area (for example, a sequence parameter set), an extension area of the sequence header, an extension area of a picture header, a slice header area, an extension area of the slice header, or a macro block header. Depth coding may be used as a separate codec. However, when depth coding is compatible with the convention codec, and only in case of a depth bit stream, it may be more efficient to add diverse attribute information. For example, depth identification information, which can identify whether or not the corresponding bit stream is a depth bit stream, may be added in the sequence header area (e.g., sequence parameter set) or the extension area of the sequence header. Depending upon the depth identification information, attribute information respective to the depth sequence may be added only when the inputted bit stream corresponds to the depth-coded bit stream.

The parsed depth bit stream (300) is entropy-decoded through the entropy decoding unit (310), and the coefficients of each macro block, motion vectors, and so on are extracted. The inverse quantizing unit (320) multiplies the received quantized value by a constant number, so as to receive (or obtain) a converted coefficient value. And, the inverse converter (330) performs inverse conversion on the coefficient value, thereby recovering the pixel value of a color picture or the depth information of a depth picture. By using the recovered pixel value of the color picture or the recovered depth information of the depth picture, the intra predictor (370) may perform an intra prediction. Meanwhile, the deblocking filter unit (340) applies deblocking filtering on each of the coded macro blocks in order to reduce block distortion. The filter softens the edge of each block, thereby enhancing the picture quality of a decoded frame. The selection of the filtering process may be decided based upon a boundary strength and a gradient of image samples located near the boundary. The depth pictures that are processed with filtering may either be outputted, or may be stored in the decoded picture buffer unit (350) in order to be used as reference pictures.

In order to perform inter prediction, the Decoded Picture Buffer unit (350) performs the role of either storing the depth pictures that were coded earlier, or exposing (or opening) the coded depth pictures. At this point, in order to perform storage or exposure in the decoded picture buffer unit (350), a frame_num and a POC (Picture Order Count) of each picture are used. Therefore, in performing depth coding, since the current depth picture and depth pictures located in other views among the picture that were coded in an earlier process, in order to use such pictures as the reference pictures, the frame_num and the POC as well as the depth view information, which can identify the viewpoint (or perspective) of a depth picture, may be collectively used.

The inter predictor (700) uses a reference picture stored in the decoded picture buffer unit (350) and inter prediction information (reference picture index information, motion vector information, etc.) received from the entropy decoding unit (310), so as to predict the current picture. A macroblock coded in an inter mode may be segmented to macroblock partitions, and each macroblock partition may be predicted by one or two reference picture. Also, in order to create a reference picture list for predicting an inter-viewpoint prediction of the depth picture, the decoded picture buffer unit (350) may use the information on the depth view. For example, depth-view reference information may be used. Herein, the depth-view reference information refers to diverse sets of information used for indicating a dependency relation between the views of each depth picture. For example, such depth-view reference information may include a number of the whole depth views, a depth view identification number, a number of depth-view reference picture, a depth view identification number of the depth-view reference picture.

The decoded picture buffer unit (350) manages the reference pictures in order to realize inter prediction more flexibly. For example, a Memory Management Control Operation Method and a Sliding Window Method may be used. This is to integrate the memory of the reference pictures and the memory of the non-reference pictures to a single memory so as to manage a single integrate memory and to perform efficient management by managing a small memory. In performing depth coding, the depth pictures may be marked with a separate indication in order to be differentiated from the color pictures within the decoded picture buffer unit. And, during the marking process, information for identifying each depth picture may be used. The reference pictures that are being managed through such process may be used for depth coding by the inter predictor (360).

The macroblock corresponds to a basic unit for processing video frames, and the macroblock may be defined as a region configured of 16×16 pixels. A macroblock larger than 16×16 may correspond to a basic unit for processing video frames having a resolution higher than the related art, and, for example, such macroblock may be defined as a region configured of 32×32 pixels or 64×64 pixels.

A macroblock type may be defined based upon the prediction type of the macroblock, i.e., based upon whether the macroblock prediction corresponds to an intra prediction mode or to an inter prediction mode. The macroblock type may include a unit of a block (hereinafter, also referred to as a prediction block size), which is coded in an intra prediction mode or as an inter prediction mode, and the macroblock type coded in the inter prediction mode may also include a direction along which the macroblock refers to the reference picture (hereinafter, also referred to as a prediction direction information).

More specifically, the macroblock coded in the intra prediction mode may use 16×16 pixels, 8×8 pixels, and 4×4 pixels as the prediction block size. The macroblock coded in the inter prediction mode may use 16×16 pixels, 16×8 pixels, 8×16 pixels, and 8×8 pixels as the prediction block size, and, in case 8×8 pixels are used, depending upon the sub-macroblock type, 8×4 pixels, 4×8 pixels, and 4×4 pixels may be used as the prediction block size.

A 4×4 intra prediction predicts the pixel value of the 4×4 pixel block, by using 4 rightside pixels within a leftside block, 4 bottom pixels within an upper block, one lower right-side pixel within the upper leftside block, and 1 lower leftside pixel within the upper rightside block, based upon the 4×4 pixel block. In this case, the encoder selects a most adequate prediction direction, among 9 different intra prediction directions of the H.264/AVC, and transmits information on the selected intra prediction direction to the decoder. The entropy decoding unit (200) extracts information on the selected intra prediction direction, and, based upon the selected intra prediction direction, the intra prediction unit (400) predicts the pixel value of the 4×4 pixel block. A 16×16 intra prediction is performed by selecting one of 4 different methods, vertical prediction, horizontal prediction, average value prediction, and flat surface prediction, from bottom 16 pixels within an upper macroblock and 16 rightside pixels within a leftside macroblock, based upon the macroblock.

Figure 4:
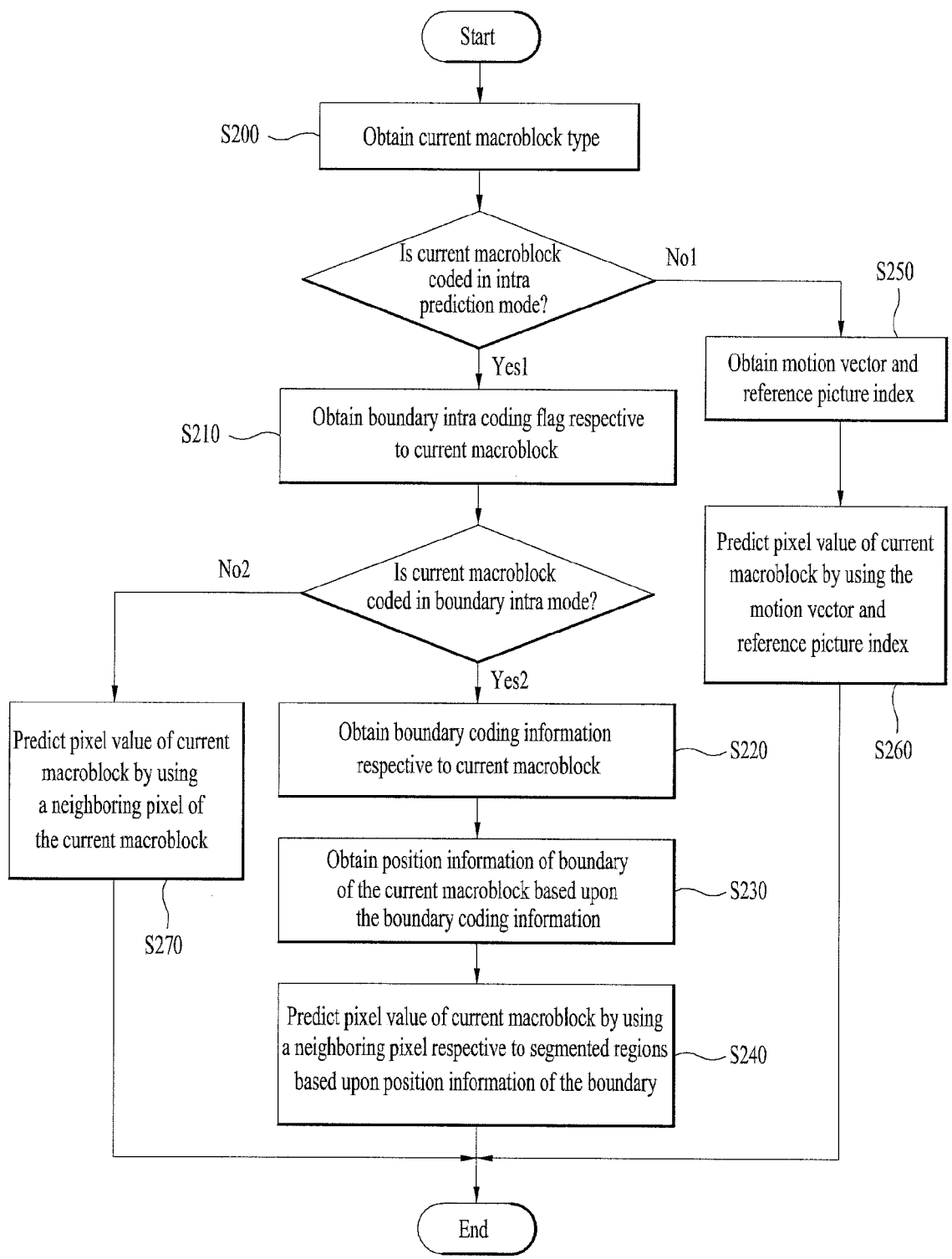
FIG. 4 illustrates a block view showing a method of performing intra prediction by using a boundary intra coding flag (boundary_coding flag).

FIG. 4 illustrates a block view showing a method of performing intra prediction by using a boundary intra coding flag (boundary_coding flag).

A boundary defined in a boundary intra coding method refers to a boundary of a region having a pixel value relatively different from the pixel value of a neighboring region within the macroblock. Therefore, a change in pixel values occur abruptly in a boundary, and the boundary may be obtained by being connected to pixels having the respective pixel values abruptly changed as compared to the change in pixel values of the neighboring regions.

In an image, the degree of change in pixel values is expressed as a gradient vector. The gradient vector may be defined as a 2×1 vector $\nabla f=(\partial f/\partial x, \partial f/\partial y)$ having an amount of change in the pixel value along a horizontal direction and an amount of change in the pixel value along a vertical direction as its elements, and the degree of change in pixel values may be measured by using the gradient vector size ($\|\nabla f\|$). Pixels neighboring the boundary shall be measured to have a large degree of change in the pixel values. And, after locating the pixels having the relatively largest degree of change, among the pixels neighboring the boundary, the boundary may be detected by connecting the located pixels.

In performing intra prediction based on the boundary, it may be indicated whether or not the current macroblock is coded in the intra prediction mode based on the boundary. For example, a boundary coding flag (boundary_coding_flag) may be used. The boundary coding flag (boundary_coding_flag) refers to a flag indicating whether or not or not the current macroblock is coded in the intra prediction mode based on the boundary.

First of all, a current macroblock type may be obtained (S200), and the boundary coding flag (boundary_coding_flag) may be obtained when the current macroblock is coded in the intra prediction mode depending upon the current macroblock type (S210). In this case, regardless of the size of the prediction block depending upon the current macroblock type, the boundary coding flag (boundary_coding_flag) may be obtained with respect to the current macroblock, and such obtainment may be limited only to macroblocks performing intra prediction by a specified prediction block size (e.g., 16×16 pixels).

However, when the current macroblock is coded in the inter prediction mode depending upon the current macroblock type, a motion vector and a reference picture index may be obtained with respect to partitions of the current macroblock (S250). Then, by using the motion vector and the reference picture index, pixel values of the current macroblock may be predicted (S260).

In case the boundary coding flag (boundary_coding_flag) does not indicate intra prediction based on the boundary with respect to the current macroblock, the macroblock is coded in a general intra prediction mode. More specifically, the intra predictor (370) uses a neighboring pixel touching (or adjacent to) the current macroblock and information on the intra prediction direction extracted from the entropy decoding unit (310), so as to predict the pixel value of the current macroblock (S270).

In case the boundary coding flag (boundary_coding_flag) indicates intra prediction based on the boundary with respect to the current macroblock, boundary coding information may be obtained with respect to the current macroblock (S220). The boundary coding information includes information on a number of pixels located at the boundary (hereinafter referred to as boundary pixels) (boundary_length), base line information, base distance information, boundary code, and vector direction information (PrevTurningDirection). Details on the boundary coding information will be described later on in more detail.

The decoder may use the boundary coding information so as to derive the position (or location) of boundary pixels included in the current macroblock (S230). Hereinafter, the method of deriving the position (or location) of boundary pixels included in the current macroblock by using the boundary coding information will be described in detail.

FIG. 5 illustrates a table showing a method for specifying a position of a base pixel.

Referring to FIG. 5, the position of the base pixel may be derived based upon the base line information and the base distance information. Herein, the base pixel refers to a pixel located at the boundary and, at the same time, located at the edge portion of the macroblock. For example, the base pixel may correspond to a pixel located at any one of a left-end pixel column of the macroblock, a right-end pixel column of the macroblock, an upper-end pixel row, and a lower-end pixel row. The base line information corresponds to information specifying the edge portion of the macroblock wherein the base pixel is located. For example, in case the base pixel is located at the left-end pixel column of the macroblock, 0 may be received (or obtained) as the base line information. The base distance information corresponds to information specifying the position of the base pixel within a pixel column or pixel row to which the base pixel belongs. For example, by assigning a number on pixels stating from the upper-end pixels or starting from the left-end pixels with respect to the pixels belonging to the pixel column or pixel row, the position of the base pixel may be specified.

The position of the reference pixel and a vector between the base pixel and the reference pixel will be described in more detail with reference to FIG. 8.

FIG. 6 illustrates an example of realizing base line information and base distance information within a syntax according to an embodiment of the present invention.

Referring to FIG. 6, a macroblock type may be obtained, a current macroblock may be coded in the intra prediction mode depending upon the macroblock type, and, in case the prediction block size is 16×16, a boundary coding flag (boundary_coding_flag) may be obtained (S300). When the boundary coding flag (boundary_coding_flag) indicates that the current macroblock performs intra prediction based on the boundary, information on a number of pixels located at the boundary (boundary_length), base line information, and base distance information may be obtained. Therefore, the entropy decoding unit 310 extracts the base line information and the base distance information, and the intra predictor 370 may use the extracted base line information and base distance information so as to derive the location of the base pixel. The location of boundary pixels may be derived by using the derived location of the base pixel and the information on a number of pixels located at the boundary (boundary_length), and this will be described in more detail with reference to FIG. 8.

Vector direction information (PrevTurningDirection) corresponds to information indicating that a position difference vector direction of the current pixel is different from a position difference vector direction of a previous pixel. For example, based upon the position difference vector direction of the previous pixel, in case the position difference vector direction of the current pixel is shifted leftwards, 0 may be obtained as the vector direction information (PrevTurningDirection) respective to the current pixel. And, based upon the position difference vector direction of the previous pixel, in case the position difference vector direction of the current pixel is shifted rightwards, 1 may be obtained as the vector direction information (PrevTurningDirection) respective to the current pixel.

The position difference vector of the current pixel may signify a position difference vector between the current pixel and a neighboring pixel. And, the current pixel corresponds to a pixel located in the boundary, and the neighboring pixel may correspond to a pixel located in the boundary and, at the same time, may also correspond to a pixel neighboring the current pixel. Similarly, the previous pixel corresponds to a pixel located in the boundary, and the neighboring pixel may correspond to a pixel located in the boundary and, at the same time, may also correspond to a pixel neighboring the previous pixel. Herein, the previous pixel signifies a position difference vector of a boundary pixel derived temporally before (or earlier than) the current pixel. However, in this case, the previous pixel corresponds to a boundary pixel having a position difference vector direction different from the position difference vector direction of the current pixel. In case more than one boundary pixels, each having a position difference vector direction different from the position difference vector direction of the current pixel, exist, the previous pixel may be defined as a most recently derived boundary pixel.

Figure 7:
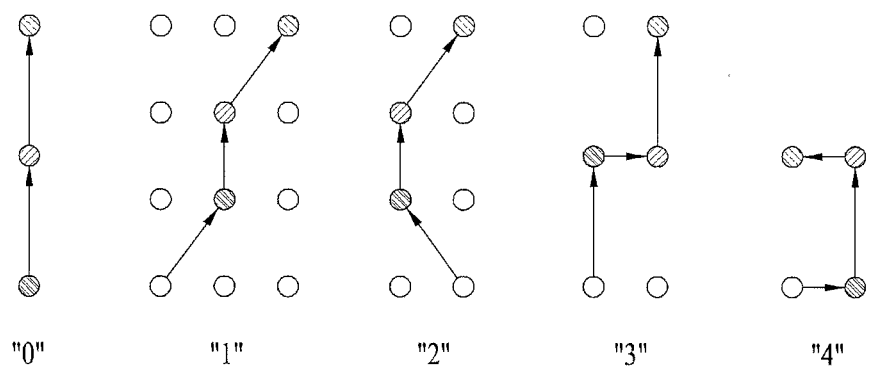
FIG. 7 illustrates a drawing for describing a boundary code, as an embodiment applying the present invention.

FIG. 7 illustrates a drawing for describing a boundary code, as an embodiment applying the present invention.

A boundary code corresponds to information indicating whether or not a the vector direction between the position difference vector of the current pixel and the position difference vector of subsequent pixels are turned, whether or not a turning direction of the current pixel and a turning direction of the previous pixel are identical to one another, and a turning angle of the current pixel. The turning direction of the current pixel may signify a turned (or changed) vector direction between a position difference vector of the current pixel and a position difference vector of subsequent pixels, and the turning direction of the previous pixel may signify a turned (or changed) vector direction between a position difference vector of the current pixel and a position difference vector of the previous pixel. A turning angle of the current pixel may signify an angle between the position difference vector of the current pixel and the position difference vector of subsequent pixels. The current pixel and the previous pixel are identical to those described above. The subsequent pixels refer to pixels located in the boundary and, at the same time, neighboring the current pixel. Also, the subsequent pixels refer to boundary pixels that are derived later than the current pixel.

Referring to FIG. 7, a case when the position difference vector of the current pixel and the position difference vector of subsequent pixels are not turned (or changed) may be set up as Mode 0. Also, a case when the turning direction of the current pixel is different from the turning direction of the previous pixel and when the turning angle of the current pixel is equal to 45 degrees may be set up as Mode 1. And, a case when the turning direction of the current pixel is identical to the turning direction of the previous pixel and when the turning angle of the current pixel is equal to 45 degrees may be set up as Mode 2. Additionally, a case when the turning direction of the current pixel is different from the turning direction of the previous pixel and when the turning angle of the current pixel is equal to 90 degrees may be set up as Mode 3. Furthermore, a case when the turning direction of the current pixel is identical to the turning direction of the previous pixel and when the turning angle of the current pixel is equal to 90 degrees may be set up as Mode 4.

FIG. 8 illustrates an exemplary syntax showing a method for deriving a position of a boundary pixel by using boundary coding information according to an embodiment of the present invention.

A boundary code respective to a boundary pixel of the current macroblock may be obtained (S400). The location of subsequent pixels may be derived by using the boundary code, a vector direction information (PrevTurningDirection), and a position difference vector between the location of the current pixel and the location of the previous pixel (S410). However, in case the current pixel corresponds to a base pixel, a previous pixel does not exist. Accordingly, in this case, the current pixel may be determined as a reference pixel. The reference pixel may refer to a pixel neighboring the base pixel. For example, based upon the base pixel, the reference pixel may be determined as one of a left-side pixel, a right-side pixel, an upper pixel, a lower pixel, an upper left-side pixel, a lower left-side pixel, an upper right-side pixel, and a lower right-side pixel. Herein, a position difference vector may be derived from the determined location of the reference pixel and location of the base pixel. This may be performed repeatedly with respect to each boundary pixel based upon the information on the number of boundary pixels (boundary_length) (S420). However, in case the boundary code corresponds to Mode 1 or Mode 3, which corresponds to a case when the turning direction of the previous pixel is different from the turning direction of the current pixel, the vector direction information (PrevTurningDirection) should be changed when deriving the location of the subsequent pixels (S430). In case the vector direction information (PrevTurningDirection) respective to the current pixel is equal to 1, the vector direction information (PrevTurningDirection) of subsequent pixels may be set to be equal to 0, and, in case the vector direction information (PrevTurningDirection) respective to the current pixel is equal to 0, the vector direction information (PrevTurningDirection) of subsequent pixels may be set to be equal to 1 (S440).

With respect to a region segmented (or divided) based upon the location of the derived boundary pixel, a pixel value of the current macroblock may be predicted by using information on a prediction mode respective to the current pixel and by using pixels neighboring the segmented regions (or divided regions) (S240). The information on the prediction mode respective to the current pixel may be known by obtaining the current macroblock type, or the information on the prediction mode respective to each of the segmented regions may also be obtained at a macroblock level.

FIG. 9 to FIG. 14 illustrate a method of performing intra prediction according to an embodiment of the present invention based on boundaries of a macroblock.

Figure 9:
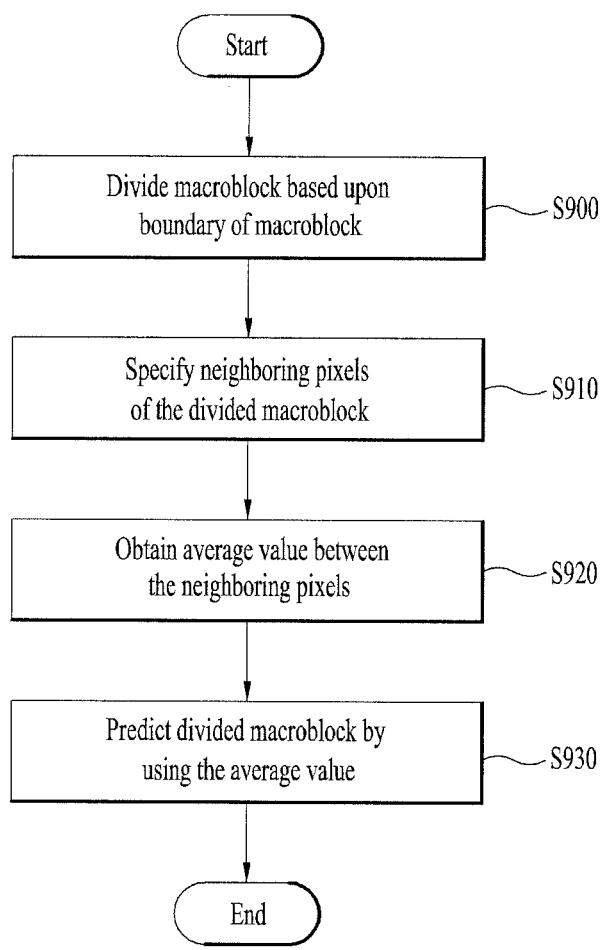
FIG. 9 to FIG. 14 illustrate a method of performing intra prediction according to an embodiment of the present invention based on boundaries of a macroblock.
Figure 10:
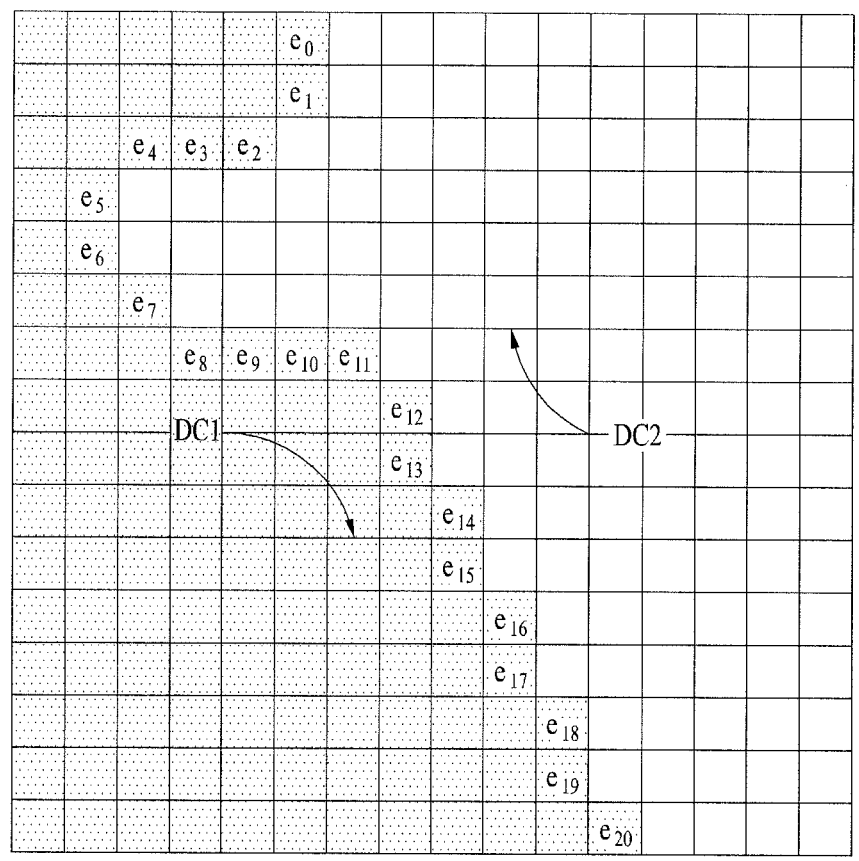

Referring to FIG. 9, when the boundary of the macroblock is derived, regions segmented based upon the boundary of the macroblock may be specified (S900). Pixels touching the segments regions (hereinafter referred to as neighboring pixels) are specific (S910), and an average value between the neighboring pixels may be obtained (S920). Herein, the neighboring pixel refers to a pixel touching the macroblock and, at the same time, refers to an upper pixel or left-side pixel touching the segmented region. Herein, pixel values of the segmented regions may be predicted by using the average value (S930). Referring to FIG. 10, region A may use an average value of left-side pixels touching region A and upper pixels, so as to predict a pixel value of region A. And, region B may use an average value of the upper pixels touching the region B, so as to predict a pixel value of region B.

Figure 11:
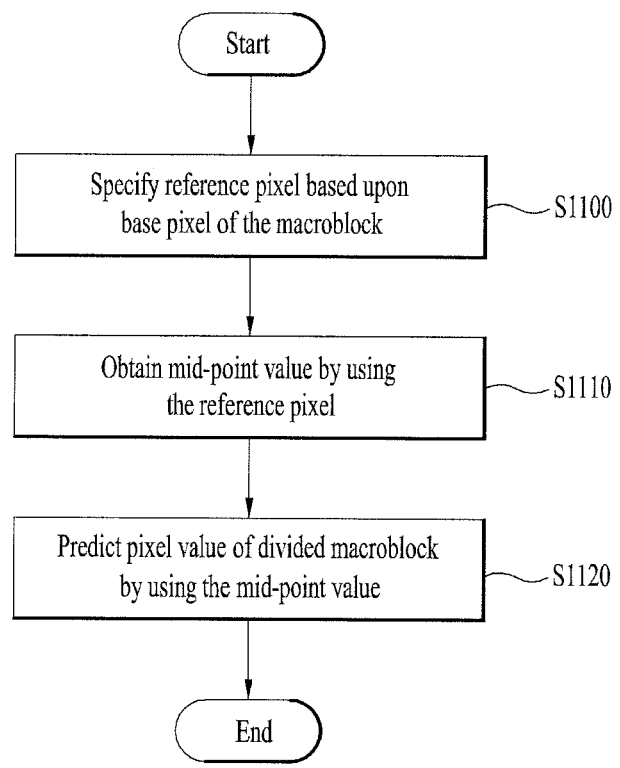
Figure 12:
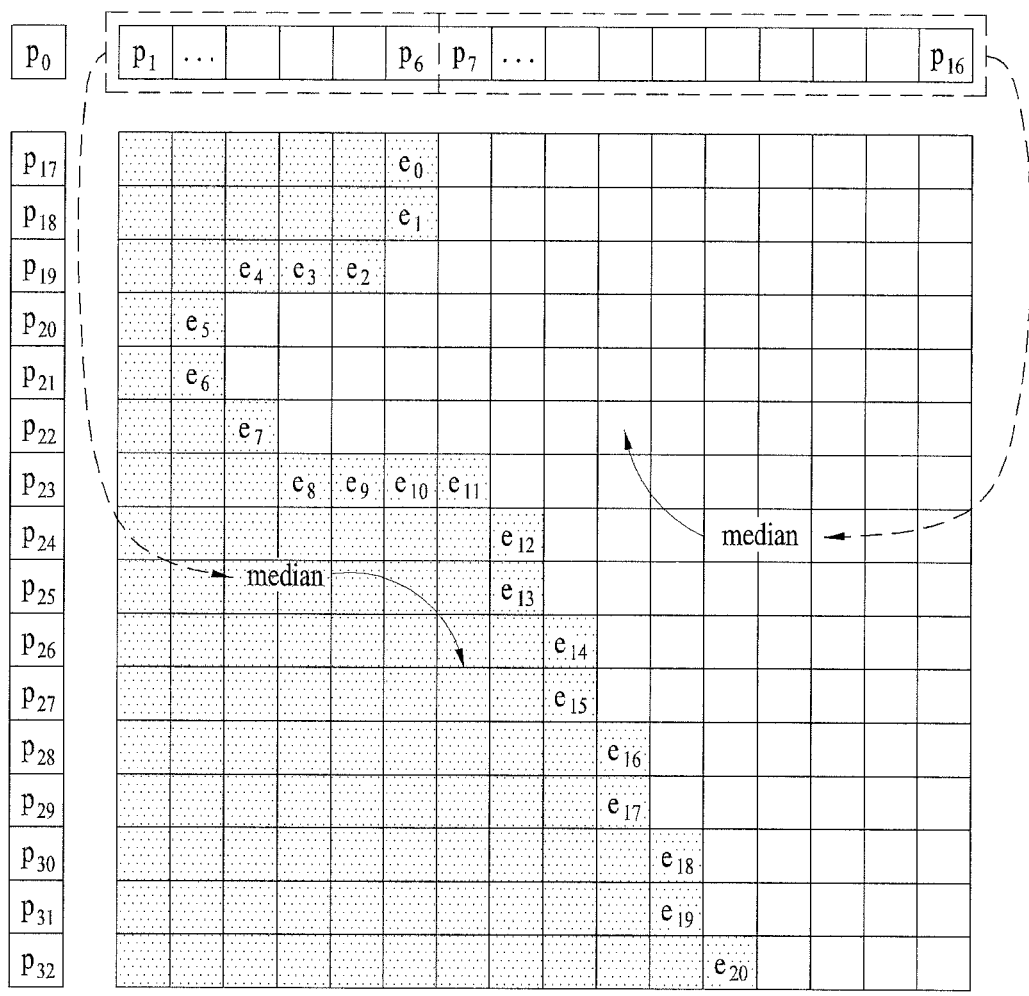

Referring to FIG. 11, a reference pixel that is to be used for intra prediction may be decided based upon a base pixel of the macroblock (S1100). For example, in case the base pixel of the macroblock is located in an upper pixel row of the macroblock, the upper pixels touching the macroblock may be used as the reference pixels, and, in case the base pixel of the macroblock is located in a left-side pixel column of the macroblock, the left-side pixels touching the macroblock may be used as the reference pixels. Then, a mid-point value between the reference pixels is obtained (S1110), and a pixel value of the macroblock may be predicted by using the obtained mid-point value (S1120). This process may be performed with respect to each of the divided regions based upon the boundary of the macroblock. This process will now be described in detail with reference to FIG. 12. Referring to FIG. 12, since the base pixel is located in an upper pixel row of the macroblock, a pixel value of region A may be predicted by using the mid-point value of the upper pixels (P1~P6) touching the macroblock. And, a pixel value of region B may be predicted by using the mid-point value of the upper pixels (P7~P16) touching the macroblock. In case the base pixel is located in a left-side pixel column of the macroblock, intra prediction may be performed by using pixels (P17~P32) adjacent to the left-side based upon the macroblock.

Figure 13:
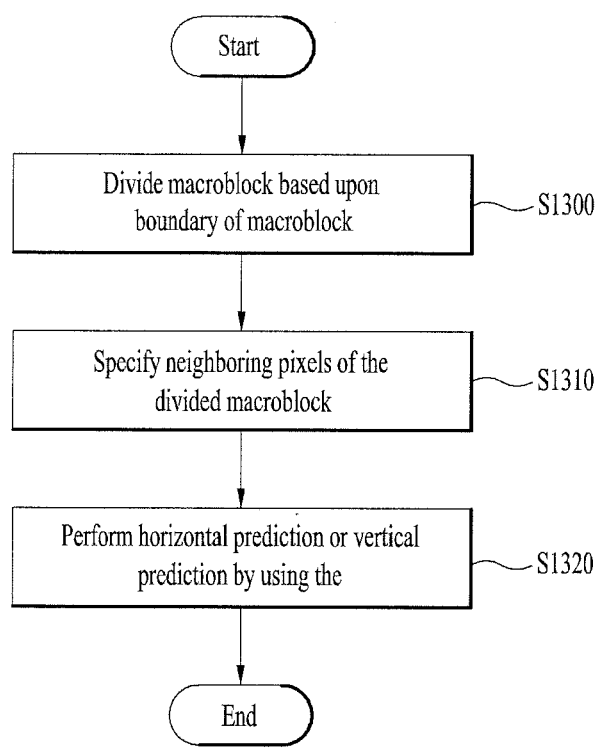
Figure 14:
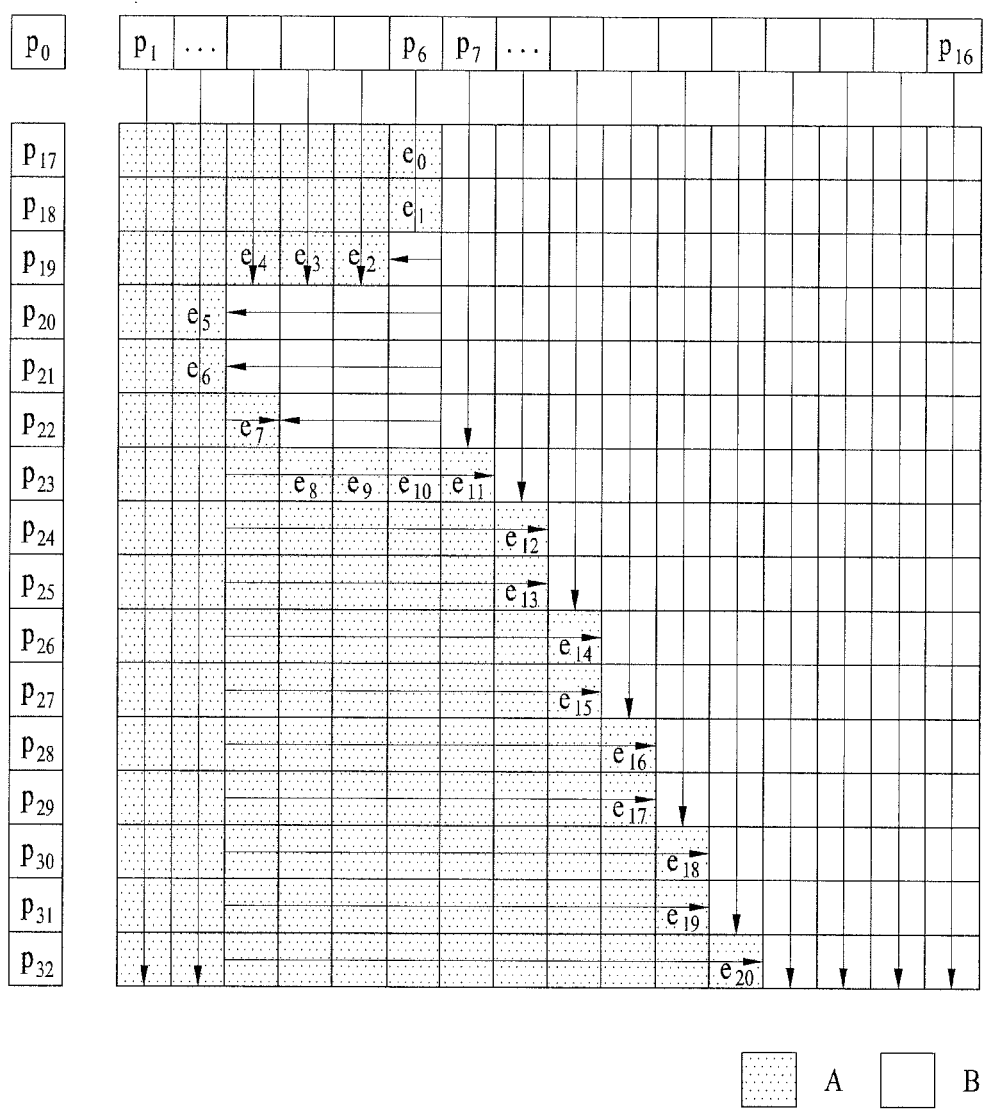

Referring to FIG. 13, intra prediction may be performed by using horizontal prediction or vertical prediction. When a boundary of the macroblock is derived, region divided (or segmented) based upon the boundary may be specified (S1300). Then, neighboring pixels touching the divided regions are specified (S1310), and, by assigning pixel values assigned to the neighboring pixels as the pixels values of the divided regions, intra prediction may be performed (S1320). In this case, vertical prediction or horizontal prediction may be performed based on the location of the base pixel. Referring to FIG. 14, in case the base pixel is located in an upper pixel row of the macroblock, vertical prediction may be performed by using pixels (P1~P16) touching the upper end of the macroblock. In this case, region A may perform vertical prediction by using the pixels touching region A (P1~P6). However, horizontal prediction may be performed on pixels located at the lower end, based upon some of the boundary pixels (e7~e20), by using the neighboring pixels of the pixels located in the lower end portion. Herein, as a pixel existing in region A, a neighboring pixel refers to a pixel touching (or being adjacent) to a pixel located in the lower end portion, and the neighboring pixel may also refer to a pixel having an already-recovered pixel value.

INDUSTRIAL APPLICABILITY

The present invention may be applied for coding video signals.

What is claimed is:
1. A video signal processing method, comprising:
obtaining a boundary intra coding flag whether a current block is coded by using boundary intra coding;
based on the boundary intra coding flag indicating that the current block is coded in an intra prediction mode by using the boundary intra coding, deriving a partition line of the current block based on a base pixel and a boundary code for at least one pixel located on the partition line, the base pixel being a starting point of the partition line, and the boundary code including information indicating whether a turning direction of a current pixel is equal to a turning direction of a previous pixel and a turning angle of the current pixel, the current pixel and the previous pixel being located on the partition line, the partition line being a boundary of a region having a pixel value different from a pixel value of a neighboring region, wherein the current block divides into A region and B region based on the partition line; and
decoding each of the regions in the current block including the A region and the B region,
wherein deriving the partition line of the current block comprises:
obtaining the base pixel, the boundary code and information about the number of the boundary pixels; and
deriving a location of boundary pixels using the base pixel, the boundary code and the information about the number of the boundary pixels, wherein the A region is decoded using a intra prediction mode of the A region being different from a intra prediction mode of the B region.

2. The method of claim 1,
wherein the boundary intra coding corresponds to intra prediction coding based on the partition line of the current block.

3. The method of claim 1, wherein, the boundary intra coding flag is obtained based on the current block being coded in the intra prediction mode.

4. The method of claim 1, wherein the boundary code is obtained based upon information on the number of pixels located on the boundary.

5. The method of claim 1, wherein deriving the partition line comprises:
specifying the base pixel based on base line information and base distance information,
wherein the base line information corresponds to information specifying an edge portion of the current block, the edge portion being one of a left-end pixel column, a right-end pixel column, a top-end pixel row and a bottom-end pixel row of the current block, and the base distance information corresponds to information specifying a position of the base pixel within the edge portion.

6. The method of claim 1, wherein pixel values of the regions are predicted by using prediction mode information of the current block and pixel values adjacent to the regions.

7. The method of claim 6, wherein the prediction mode information corresponds to one of vertical prediction, horizontal prediction, average value prediction, and flat surface prediction.

8. The method of claim 1, wherein decoding each of regions in the current block including A region and the B region comprises:
specifying the A region based on the partition line of the current block;
specifying neighboring pixels touching the A region;
when the intra prediction mode of the A region is DC mode, obtaining an average value corresponding the A region using the neighboring pixels touching the A region;
predicting pixels of the A region using the average value corresponding the A region;
specifying the B region based on the partition line of the current block;
specifying neighboring pixels touching the B region;
when the intra prediction mode of the B region is vertical mode, predicting pixels of the B region using above neighboring pixels being above the B region in the neighboring pixels touching the B region.

* * * * *